(12) United States Patent
Matsuzaki et al.

(10) Patent No.: US 9,526,199 B2
(45) Date of Patent: Dec. 27, 2016

(54) WORK VEHICLE COORDINATING SYSTEM

(71) Applicant: Kubota Corporation, Osaka-shi (JP)

(72) Inventors: Yushi Matsuzaki, Sakai (JP); Atsushi Shinkai, Sakai (JP); Yasuhisa Uoya, Sakai (JP)

(73) Assignee: Kubota Corporation, Osaka (JP)

(*) Notice: Subject to any disclaimer, the term of this patent is extended or adjusted under 35 U.S.C. 154(b) by 0 days.

(21) Appl. No.: 14/893,368

(22) PCT Filed: Jul. 13, 2015

(86) PCT No.: PCT/JP2015/070004
§ 371 (c)(1),
(2) Date: Nov. 23, 2015

(87) PCT Pub. No.: WO2016/017408
PCT Pub. Date: Feb. 4, 2016

(65) Prior Publication Data
US 2016/0174453 A1   Jun. 23, 2016

(30) Foreign Application Priority Data

Jul. 29, 2014 (JP) ................. 2014-153901

(51) Int. Cl.
*A01B 69/00* (2006.01)
*G05D 1/02* (2006.01)

(52) U.S. Cl.
CPC ............... *A01B 69/00* (2013.01); *G05D 1/02* (2013.01); *G05D 1/0278* (2013.01);
(Continued)

(58) Field of Classification Search
CPC ........ A01B 69/00; G05D 1/02; G05D 1/0291; G05D 1/0295; G05D 2201/0201; G05D 1/0278
See application file for complete search history.

(56) References Cited

U.S. PATENT DOCUMENTS

| 6,148,255 A | 11/2000 | van der Lely |
| 6,732,024 B2 | 5/2004 | Rekow et al. |

(Continued)

FOREIGN PATENT DOCUMENTS

| JP | 11-039036 A | 2/1999 |
| JP | 11-266608 A | 10/1999 |

(Continued)

*Primary Examiner* — Russell Frejd
(74) *Attorney, Agent, or Firm* — The Webb Law Firm

(57) ABSTRACT

A work vehicle coordinating system includes a main vehicle position detection module for detecting a position of a main work vehicle, a sub vehicle position detection module for detecting a position of a sub work vehicle, a central work land path calculation section for calculating a central work land traveling path to be used by the sub work vehicle in an unmanned steered work traveling in a central work land, a first steering control section for unmanned-steering the sub work vehicle ahead of the main work vehicle based on the position of the sub work vehicle detected by the sub vehicle position detection module and the central work land traveling path, a headland path calculation section for calculating a headland traveling path, and a second steering control section for unmanned-steering the sub work vehicle to follow the main work vehicle.

5 Claims, 12 Drawing Sheets

(52) U.S. Cl.
CPC ......... *G05D 1/0291* (2013.01); *G05D 1/0295* (2013.01); *G05D 2201/0201* (2013.01)

(56) References Cited

U.S. PATENT DOCUMENTS

| | | | |
|---|---|---|---|
| 8,131,432 B2 * | 3/2012 | Senneff | A01B 69/007 701/23 |
| 8,346,443 B2 * | 1/2013 | Senneff | A01B 69/007 340/988 |
| 8,437,901 B2 * | 5/2013 | Anderson | G05D 1/0088 340/435 |
| 8,639,408 B2 * | 1/2014 | Anderson | G05D 1/0088 701/1 |
| 2002/0165649 A1 | 11/2002 | Rekow et al. | |
| 2006/0195238 A1 * | 8/2006 | Gibson | A01B 69/008 701/23 |
| 2007/0233348 A1 | 10/2007 | Diekhans et al. | |
| 2011/0112730 A1 | 5/2011 | Rekow | |
| 2014/0277899 A1 | 9/2014 | Matsuzaki et al. | |
| 2016/0120095 A1 * | 5/2016 | Fujimoto | A01B 69/008 701/24 |

FOREIGN PATENT DOCUMENTS

| | | |
|---|---|---|
| JP | 2000-014208 A | 1/2000 |
| JP | 2001-507843 A | 6/2001 |
| JP | 2014-178759 A | 9/2014 |

\* cited by examiner

Fig.3
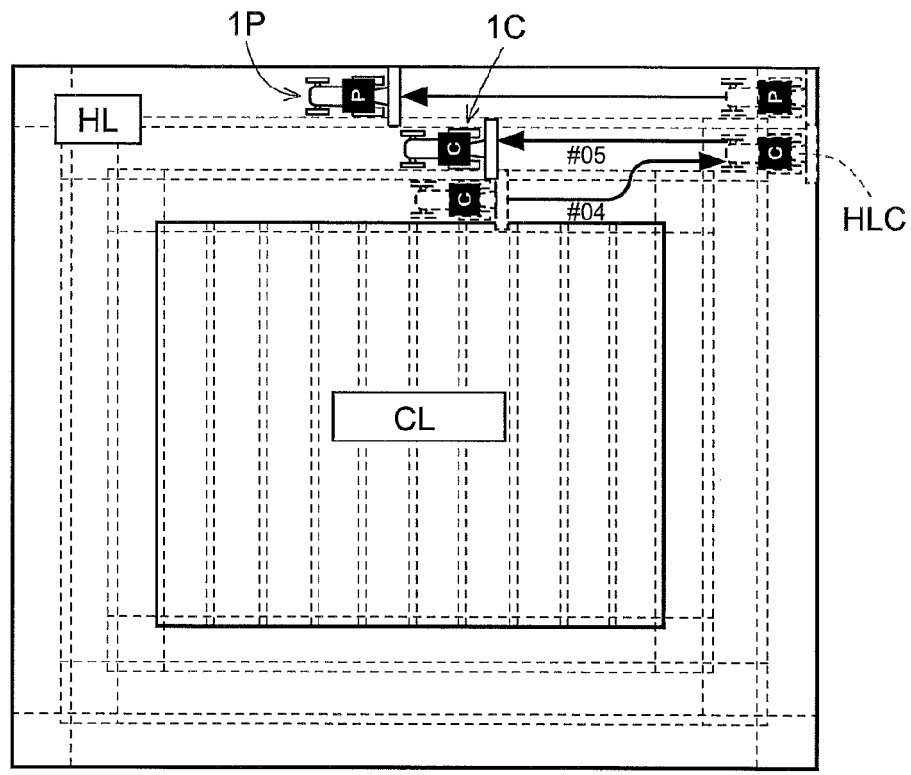
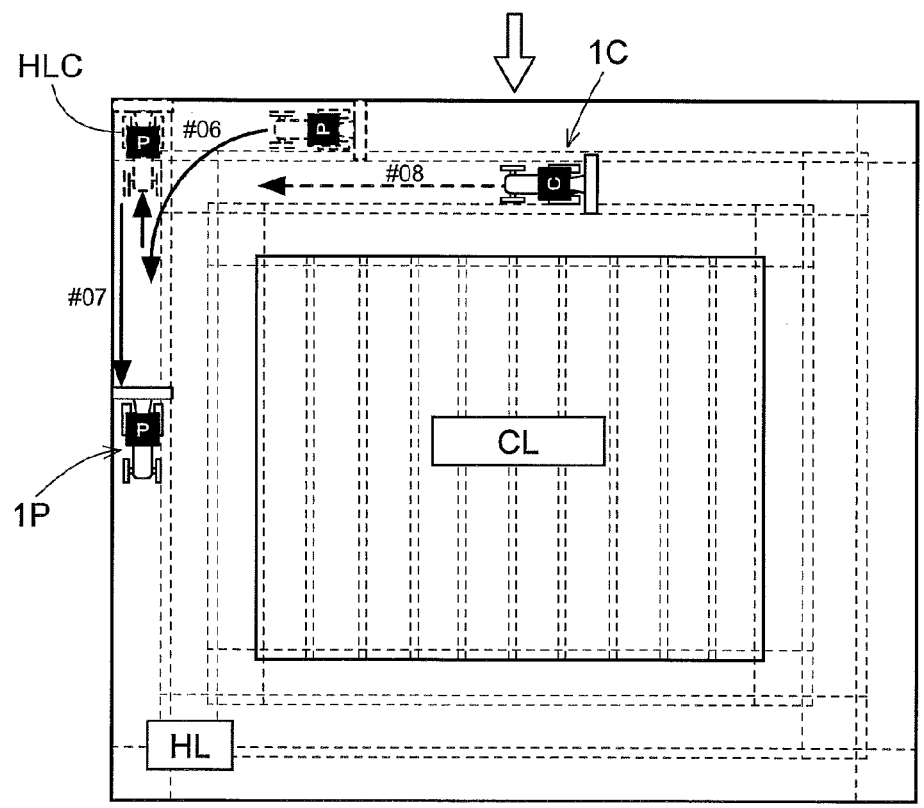

Fig.8
(a)
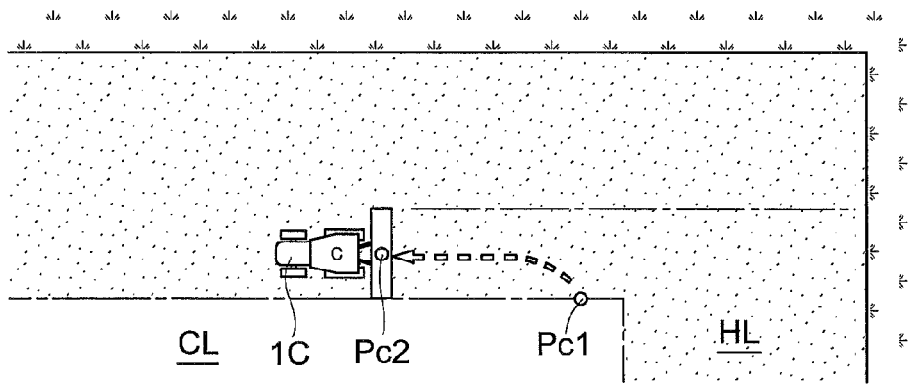
(b)
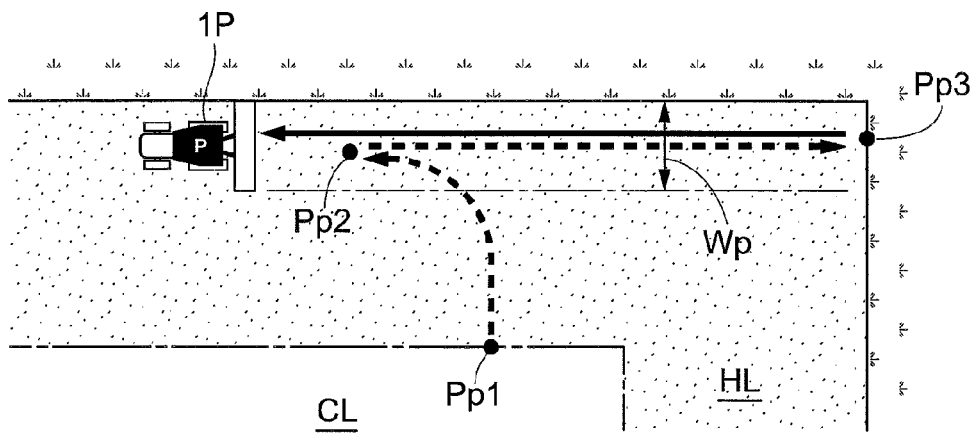
(c)
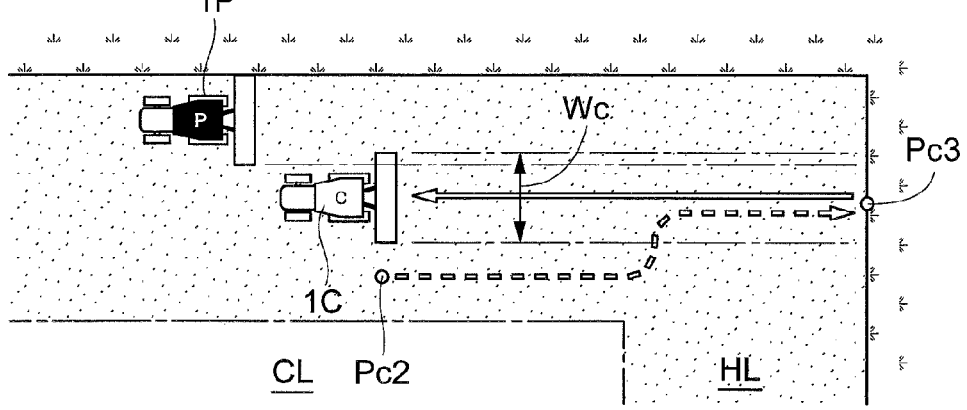

WORK VEHICLE COORDINATING SYSTEM

CROSS-REFERENCE TO RELATED APPLICATIONS

This application is the U.S. national phase of International Application No. PCT/JP2015/070004 filed Jul. 13, 2015, and claims priority to Japanese Patent Application No. 2014-153901 filed Jul. 29, 2014, the disclosures of which are hereby incorporated in their entirety by reference.

TECHNICAL FIELD OF THE INVENTION

The present invention relates to a work vehicle coordinating system for carrying out a ground work (ground-preparing work) in a central work land and a headland extending around the central work land by a unmanned steerable sub work vehicle and a man-steered main work vehicle in cooperation with each other.

BACKGROUND OF THE INVENTION

From Patent Document 1, there is known a vehicle control system configured to determine target traveling positions one after another based on an actual traveling position of a main work vehicle and then to control a sub work vehicle toward each target traveling position. With this vehicle control system, there are disclosed a control mode for causing the sub work vehicle to follow the main work vehicle in such a manner to maintain offset amounts in the X (longitude) direction and the Y (latitude) direction which have been set relative to the main work vehicle, and a further control mode for causing the sub work vehicle to follow the main work vehicle along a traveling path which is obtained as a target traveling path by parallel shifting the traveling path of the main work vehicle by a working width amount, and so on.

The "follow-up" control according to Patent Document 1 is designed for a work in a large and wide-open work land, not for a ground work in such a work land as a field having a relatively small area bordered by a ridge. In the case of a ground work in such a work land (field), in particular a ground work for agricultural production, the work load will be divided into a central work land traveling in which straight work traveling and U-turn are effected in repetition in a central region (central work land) of the work land, and a headland traveling for effecting a work in and along a headland work traveling region (called "headland") delimited by/along the circumference of the central work land, and the ground work will be effected separately for these divided works. For this reason, the central work and the headland work land will be preliminarily divided into a central work land and a headland. And, different controlling operations are required between the central work land traveling and the headland traveling.

Execution of a ground work such as a cultivating work for the central work land traveling and the headland traveling by a single unmanned work vehicle is known from e.g. Patent Document 2. However, merely combining the control configurations such as those disclosed in Patent Document 1 and Patent Document 2, under a work vehicle coordinating control operatively linking a main work vehicle and a sub work vehicle, may not provide effective realization of the central work land traveling consisting mainly of straight traveling and the headland traveling involving complicated turns.

PRIOR ART LITERATURE

Patent Documents

Patent Document 1: U.S. Pat. No. 6,732,024 (U.S. Pat. No. 6,732,024 B2)
Patent Document 2: Japanese Unexamined Patent Application Publication No. "Heisei" 11-266608 (JP H11-266608 A).

SUMMARY OF THE INVENTION

Problem to be Solved by the Invention

In view of the above-described state of the art, there is need for a work vehicle coordinating system that realizes a land work traveling directed to a central work land and a headland through effective cooperation of a main work vehicle and a sub work vehicle.

Means for Solving the Problem

A work vehicle coordinating system according to the present invention for carrying out a ground work (ground-preparing work) in a central work land and a headland extending around the central work land by an unmanned steerable sub work vehicle and a man-steered main work vehicle in cooperation with each other, comprises:

a main vehicle position detection module for detecting a position of the main work vehicle;

a sub vehicle position detection module for detecting a position of the sub work vehicle;

a central work land path calculation section for calculating a central work land traveling path to be used by the sub work vehicle in an unmanned steered work traveling in the central work land;

a first steering control section for unmanned-steering the sub work vehicle ahead of the main work vehicle based on the position of the sub work vehicle detected by the sub vehicle position detection module and the central work land traveling path;

a headland path calculation section for calculating a headland traveling path to be used for unmanned steered traveling of the sub work vehicle based on a traveling path of the main work vehicle in the headland; and a second steering control section for unmanned-steering the sub work vehicle to follow the main work vehicle based on the position of the sub work vehicle detected by the sub vehicle position detection section and the headland traveling path.

With the above-described configuration, in a central work land traveling consisting mainly of straight traveling, the sub work vehicle which is steered in an unmanned manner is caused to travel ahead of the main work vehicle. Then, a driver of the main work vehicle will control the vehicle to travel along a work track of the sub work vehicle while viewing this work track. In this way, since the work track is used as a target line, the driver can control the vehicle easily. Further, in a headland traveling which requires completed turn traveling, it is difficult to calculate a traveling path for unmanned-steering without any reference path. Therefore, in such turning traveling, the main work vehicle controlled by a human is caused to travel first and with use of a traveling path of this main vehicle as a reference path, it becomes relatively easy to calculate the traveling path for unmanned-steering. In this way, based on the ingenious concept of leading by the sub work vehicle for a central work land and leading by the main work vehicle for a headland, there has been realized a work vehicle coordinating system which effectively links a main work vehicle and a sub work vehicle.

In the calculation of the central work land traveling path for use in the unmanned steered work travel, the contour of the main work land is required. This main work land contour can be obtained easily if map data of the work land is available. However, in the case of a work land such as an agricultural field, such map data is often unavailable. For this reason, according to one preferred embodiment of the present invention, the system further comprises a work land contour calculation module configured to calculate a contour of the work land through a teaching travel; and the central work land path calculation section calculates the central work land traveling path, based on the work land contour calculated by the work land contour calculation module. With this, contour of a work land can be obtained even if no map data is available for the work land.

In the work vehicle coordinating system of the present invention, the main work vehicle and the sub work vehicle are provided respectively with the position detection module, an example of which is a Satellite Positioning System. Therefore, the teaching travel for detecting the work land contour is possible with both the main work vehicle and the sub work vehicle. However, it is the sub work vehicle that is controlled in an unmanned manner. Therefore, preferably, the work land contour calculation module is mounted on the sub work vehicle.

According to one preferred embodiment of the present invention, the central work land path calculation section and the headland path calculation section are mounted on the sub work vehicle; and traveling data indicating a work traveling track of the main work vehicle in the headland is transmitted from the main work vehicle to the sub work vehicle. With this configuration, the main work vehicle needs to be equipped with only a device for transmitting data representing a work traveling track thereof in a headland (i.e. data representing the traveling track) to the sub work vehicle, so that the equipment required for the main work vehicle in this work vehicle coordinating system is limited. And, if the remaining components/sections are combined into a unit which is to be mounted on the sub work vehicle side, the configuration of the work vehicle coordinating system is simplified and maintenance and inspection thereof can be made simple.

When the main work vehicle travels to follow the unmanned steered sub work vehicle which is traveling ahead, a driver of the main work vehicle can monitor the condition of the work traveling of the sub work vehicle in an effective manner. For instance, when a cultivating work is being carried out, the driver of the main work vehicle will visually check the cultivation condition provided by the sub work vehicle at a position close-by, so that the driver can judge appropriateness of a cultivating depth, appropriateness of cultivating speed, etc. by themselves. And, the results of such judgements by the driver can be utilized appropriately through an operation of an implement of the main work vehicle. However, it is preferred that such results of the driver's judgment can be fed back to the sub work vehicle also. To this end, according to one preferred embodiment of the present invention, a sub work vehicle implement remote control module for remotely controlling an operation of a ground work implement mounted on the sub work vehicle is mounted on the main work vehicle.

Other characterizing features and advantageous effects achieved thereby will become apparent upon reading the following description with reference to accompanying drawings.

BRIEF DESCRIPTION OF THE DRAWINGS

FIG. 3 is a diagram showing continuation of the traveling path of the main work vehicle and the traveling path of the sub work vehicle as shown in FIG. 2.

EMBODIMENTS FOR CARRYING OUT THE INVENTION

Before describing specific embodiments of a work vehicle coordinating system according to the present invention, basic examples of a traveling track of a main work vehicle and a traveling track of a sub work vehicle under this work vehicle coordinating system will be described with reference to FIG. 1, FIG. 2, FIG. 3 and FIG. 4. In this work vehicle coordinating system, a main work vehicle 1P of a manned steering type and a sub work vehicle 1C, which is capable of unmanned traveling, carry out a ground work (ground preparation work) in cooperation with each other.

Figure 1:
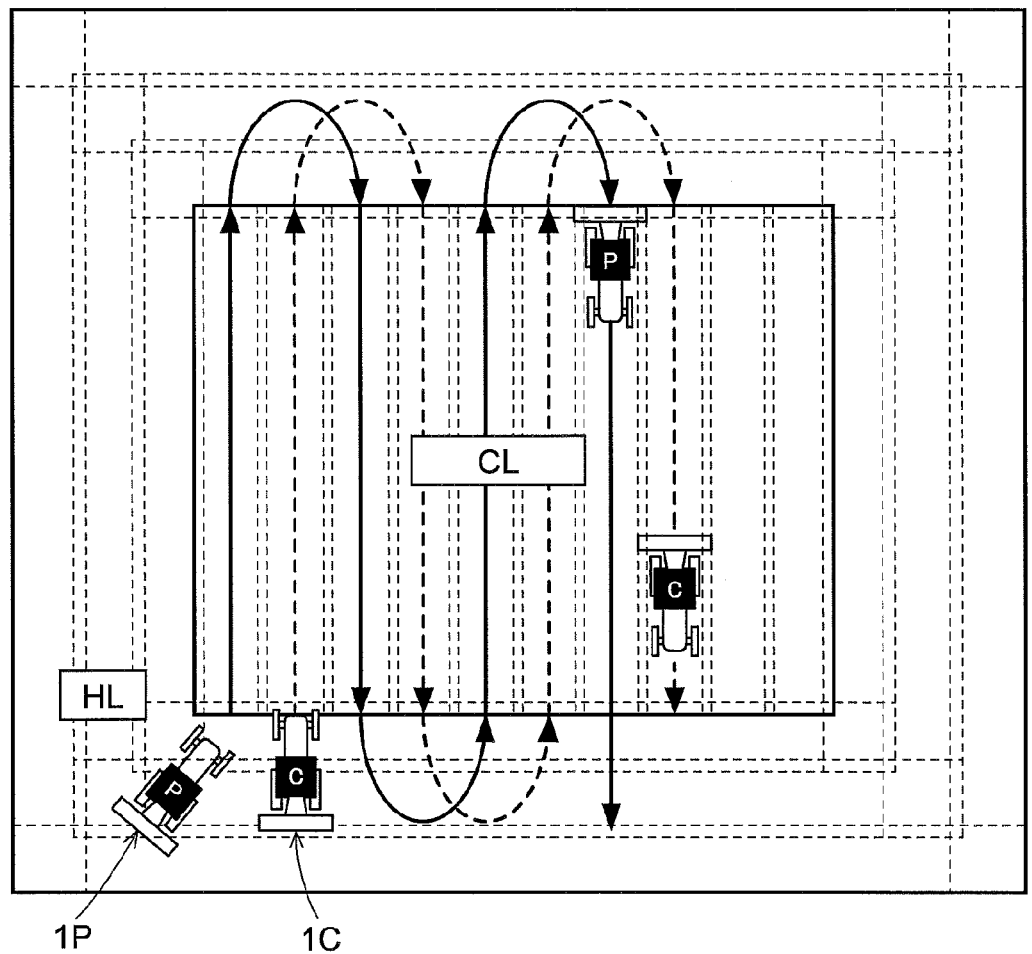
FIG. 1 is a diagram showing one basic example of a traveling path of a main work vehicle and a traveling path of a sub work vehicle using a work vehicle coordinating system according to the present invention in a central work land.

In this example, a site of ground work is an agricultural field delimited by a ridge, and a ground work will be carried out by a width amount of a ground work implement in association with traveling of the work vehicle. For a work in a field, the field will be typically divided into an approximately square-shaped (rectangular) central work land CL and a headland HL delimited by/along the ridge around the central work land CL. In the central work land CL, as shown in FIG. 1, the ground work is carried out by reciprocated traveling, so that its traveling path will comprise repeated executions of a straight forward traveling and turning (U-turn) traveling, a straight reverse traveling and a turning (U-turn) traveling. The headland HL forms a turning area in the work traveling in the central work land CL. In the headland HL, the ground work will be effected by repetition of a straight traveling and a turning traveling (redirecting) at each corner area.

Here, based on a central work land traveling path calculated as a target traveling path for unmanned traveling, the sub work vehicle 1C travels in unmanned manner ahead of the main work vehicle 1P. After this unmanned traveling of the sub work vehicle 1C, the main work vehicle 1P will travel on the left side thereof in such a manner that a work track of this main work vehicle 1P will be overlapped by a predetermined amount with the work track of the sub work vehicle 1C.

Figure 2:
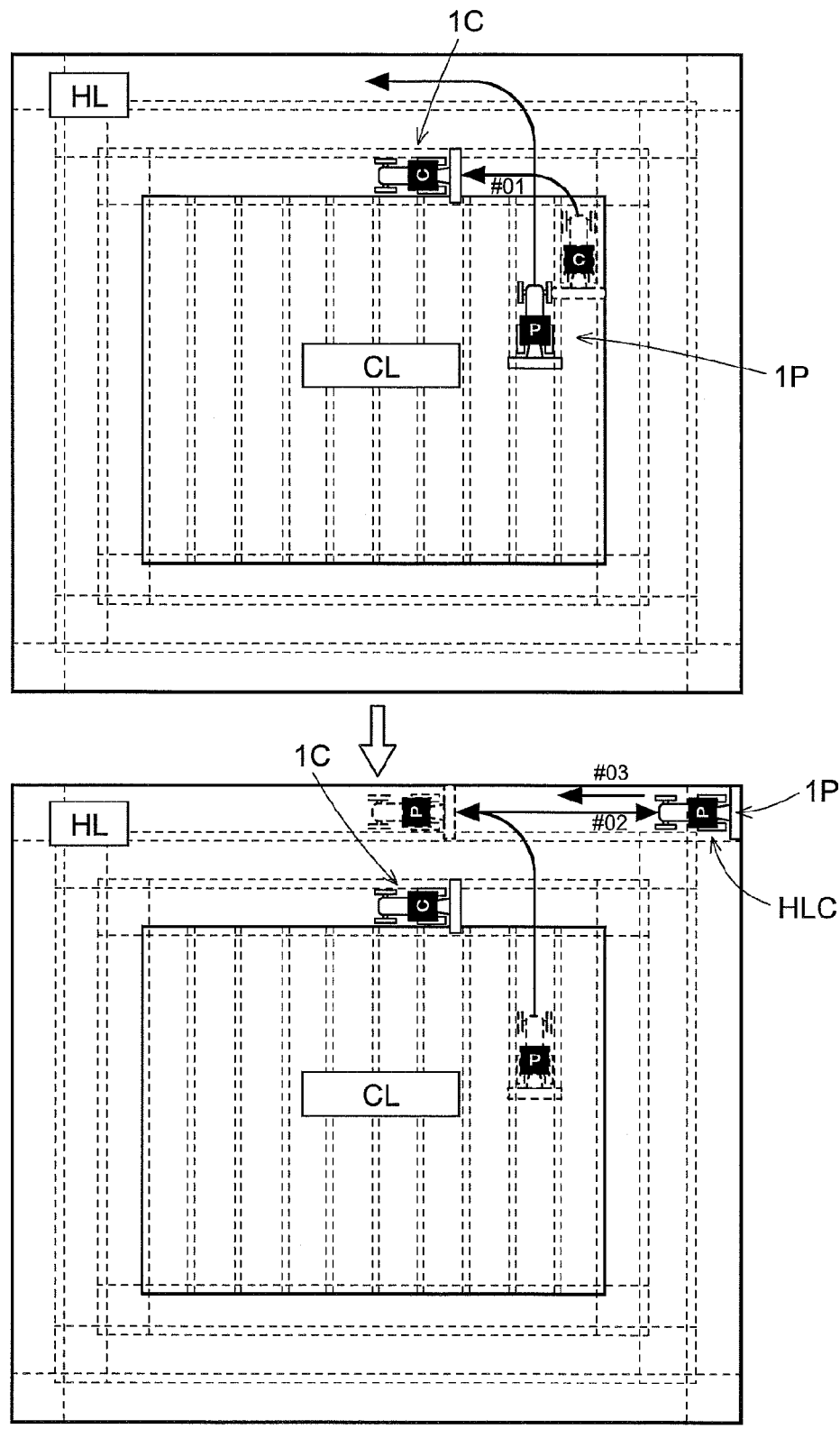
FIG. 2 is a diagram showing one basic example of a traveling path of the main work vehicle and a traveling path of the sub work vehicle using the work vehicle coordinating system according to the present invention in a headland.

As shown in the upper-side drawing in FIG. 2, if the number of a plurality of straight reciprocating paths in the central work land CL is an even number, at the time of substantial completion of work traveling, the main work vehicle 1P is to be positioned on the immediate left side of the sub work vehicle 1C. From this position, a work on the headland HL is started. In this headland HL, the main work vehicle 1P will travel first and then the sub work vehicle 1C will follow the main work vehicle 1P. Therefore, based on a traveling track of the main work vehicle 1P in the headland HL, a headland traveling path will be calculated as a target traveling path for use in unmanned steered traveling of this sub work vehicle 1C. Incidentally, for this headland HL, three (3) rounds of headland traveling path are set in advance.

Prior to substantial headland traveling, as an initial traveling therefor, the sub work vehicle 1C will be evacuated to a position in the headland HL where this sub work vehicle 1C will not present any obstacle to traveling of the main work vehicle 1P (#01). This initial traveling can be either manned traveling or unmanned traveling. Thereafter, as shown in the lower side drawing in FIG. 2, the main work vehicle 1P will enter first the outermost headland traveling path and then make a turn and travel in reverse to make a stop at a headland corner HLC which is a start point of a headland straight traveling (#02). Next, the main work vehicle 1P will activate its ground work implement and start a work traveling in forward (#03).

As shown in the upper drawing in FIG. 3, when the main work vehicle 1P travels past the sub work vehicle 1C, then, according to a headland traveling path of the sub work vehicle 1C which is calculated and defined on the inner circumferential side of the headland traveling path of the main work vehicle 1P, the sub work vehicle 1C will travel in reverse and make a stop at the headland corner HLC which is the start point of the headland straight traveling (#04). Thereafter, the sub work vehicle 1C will start a work traveling in forward to follow the main work vehicle 1P (#05). As shown in the lower side view in FIG. 3, when the main work vehicle 1P arrives at a position immediately before the next headland corner HLC, as well-known as a turning traveling pattern, with deactivation of the ground work implement thereof, the vehicle will make a turning traveling (in this case 90 degrees turn) to advance toward a next headland traveling path and then travel in reverse to enter the headland corner HLC (#06). Then, the main work vehicle 1P will activate its ground work implement and start a work traveling in forward (#07). In the course of this, the sub work vehicle 1C will stand by at a position not providing any obstacle to the turning traveling of the main work vehicle 1P (#08) and then will effect a turning traveling according to a target traveling path for the turning traveling which is calculated with reference to the turning traveling track of the main work vehicle 1P. With such turning traveling, the headland works by the main work vehicle 1P and the sub work vehicle 1C will be carried out.

Figure 4:
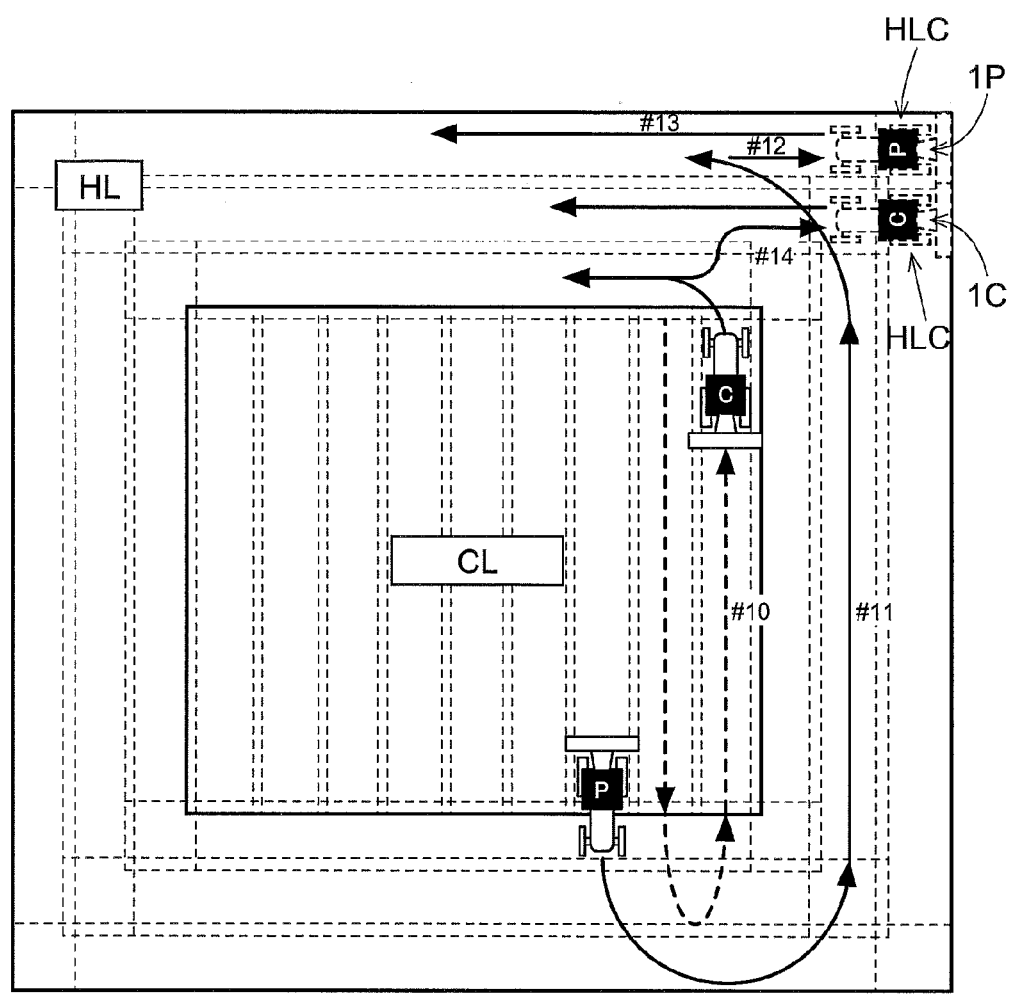
FIG. 4 is a diagram showing a further basic example of a traveling path of the main work vehicle and a traveling path of the sub work vehicle using the work vehicle coordinating system according to the present invention in a headland.

In the upper side drawing in FIG. 2, there is shown the example in which an even number of straight reciprocating paths exist in the central work land CL. Whereas, FIG. 4 shows an example in which an odd number of straight reciprocating paths exist in the central work land CL. In this case, the preceding sub work vehicle 1C will move from the first before the last straight path into the last straight path directly and will effect a work traveling along this last straight path and make a stop thereafter (#10). Whereas, the following main work vehicle 1P will travel along the second from the last straight path and then enter the headland HL directly and bypass the traveling track of the sub work vehicle 1C (#11) and then enter the headland traveling path in the outermost circumference and then make a turn and travel in reverse and eventually make a stop at the headland corner HLC which is the start point of the headland straight traveling (#12). Further, the main work vehicle 1P will activate its ground work implement and start a work traveling in forward (#13). Subsequently, the sub work vehicle 1C will make a turn at a position where interference with the main work vehicle 1P can be avoided and arrive at the headland corner HLC (#14).

In the foregoing discussion, it was assumed that the main working width which is the ground working width of the main work vehicle 1P is equal to the sub working width which is the ground working width of the sub work vehicle 1C. But, these working widths can be set to be different from each other also. The position displacement amount in the lateral direction between the main work vehicle 1P and the sub work vehicle 1C should ideally be: (main working width+sub working width)/2. However, in order to avoid any leftover of work load due to follow-up control error, there is provided an overlap of about a few tens of centimeters, for instance.

Figure 5:
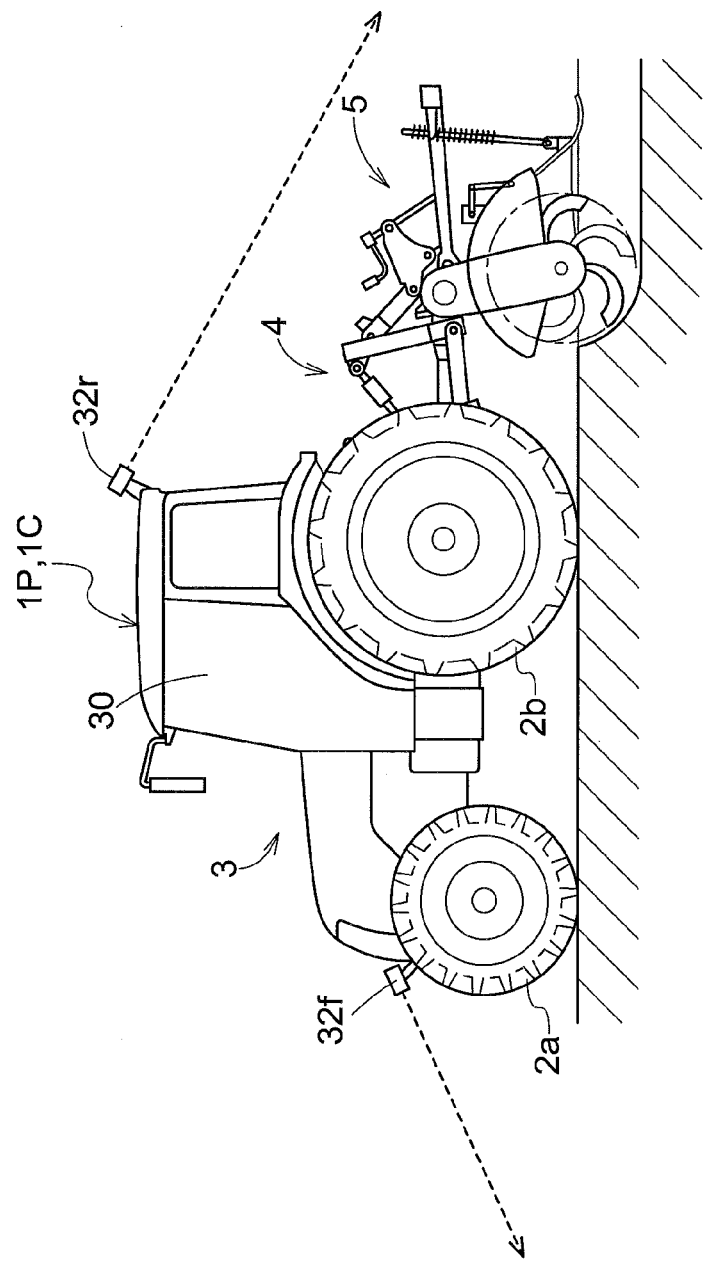
FIG. 5 is a side view of a tractor equipped with a cultivator implement applied as an example of work vehicle, in the work vehicle coordinating system according to one specific embodiment of the present invention (same in the subsequently numbered drawings up to FIG. 10)

Next, one specific embodiment of the work vehicle coordinating system according to the present invention will be described. In this embodiment, FIG. 5 shows a tractor equipped with a cultivator implement for cultivating an agricultural field delimited by a ridge. A main tractor 1P as a main work vehicle 1P and a sub tractor 1C as a sub work vehicle 1C are of a substantially same type, including a steering section 30 formed at a center of a vehicle body 3 supported by front wheels 2a and rear wheels 2b. To the rear portion of the vehicle body 3, there is mounted a cultivator implement 5 as a ground work implement via a hydraulic lift mechanism 4. In the steering section 30 each of the main tractor 1P and the sub tractor 1C, respectively, there are provided such conventional devices as a steering wheel, various kinds of operational levers, a seat at which a driver is to be seated, and so on. At the time of execution of follow-up control based on the inventive work vehicle coordinating system, the main tractor 1P will be steered/controlled by a human driver, whereas the sub tractor 1C will be steered/controlled without any human intervention.

Incidentally, in this sub tractor 1C which effects unmanned traveling, a laser radar system is mounted. As shown schematically in FIG. 5, in a lower end region of a front grill and at the left-right center thereof, a front laser radar unit 32f is attached with using a bracket. In an upper end region of a cabin and at the left-right center thereof, a rear laser radar unit 32r is attached. This laser radar system per se is well-known. In this case, the front laser radar unit 32f targets any object which may be present a few or several meters ahead and which has a ground height of a few or several centimeters, with the unit covering a peripheral area of about 270 degrees by scanning. And, the rear laser radar unit 32r targets any object which may be present a few or several meters rearwardly of the cultivator implement 5 (work implement) and which has a ground height of a few or several centimeters, with the unit covering a peripheral area of about 120 degrees by scanning. With use of this laser radar system, when an object approaching and entering a predetermined area of the sub tractor 1C is detected, the vehicle body 3 and the cultivator implement 5 are stopped automatically. Incidentally, when necessary, a similar laser radar system can be mounted on the main tractor 1P.

Figure 6:
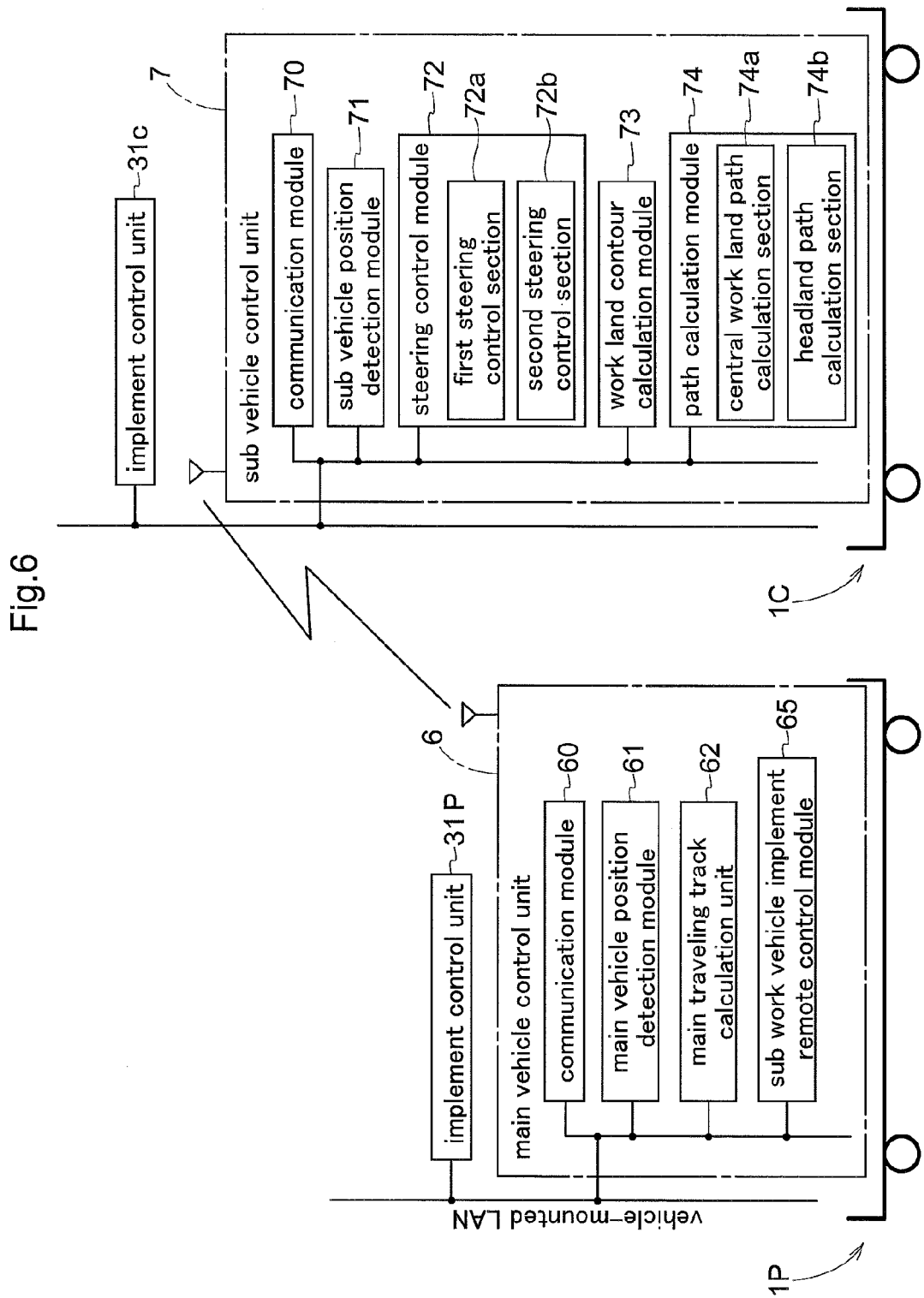
FIG. 6 is a functional block diagram showing functional sections constituting the work vehicle coordinating system.

As shown in FIG. 6, in this embodiment, an electronic control unit for constituting the work vehicle coordinating system is divided into a main vehicle control unit 6 which is to be mounted on the main tractor 1P and a sub vehicle control unit 7 which is to be mounted on the sub tractor 1C. The main vehicle control unit 6 and the sub vehicle control unit 7 include communication modules 60, 70, respectively, to allow wireless data transmission therebetween.

The main vehicle control unit 6 further includes such functional units as a main vehicle position detection module 61, a main traveling track calculation section 62, a sub work vehicle implement remote control module 65, and so on. These functional units can sometimes effect operations in cooperation with hardware, but are realized substantially with execution of a computer program.

The main vehicle position detection module 61 detects a position of its own, that is, a position of the main tractor 1P, with utilizing RTK-GPS (Real Time Kinematic GPS (Global Positioning System)). The main traveling track calculation section 62 calculates a traveling track of the main tractor 1P from the position detected by the main vehicle position detection module 61. The calculated traveling track of the main tractor 1P will be made into data, which is then transmitted to the sub work vehicle 1C. The sub work vehicle implement remote control module 65 has a function of wirelessly adjusting, from the main work vehicle 1P, various states of the cultivator implement 5 mounted on the sub work vehicle 1C such as a lifting height, a cultivating rotational seed, etc. And, the sub work vehicle implement remote control module 65 includes a remote controller which is operated by the driver of the main work vehicle 1P, and a control signal generated by a remote control operation will be wirelessly forwarded by an implement control unit 31c to the sub work vehicle 1C, whereby the cultivator implement 5 of the sub work vehicle 1C is controlled. Incidentally, a reference mark 31P represents an implement control unit of the main work vehicle 1P.

The sub vehicle control unit 7 also includes such functional units/sections as a sub vehicle position detection module 71, a steering control module 72, a work land contour calculation module 73, a path calculation module 74, and so on. These functional units can sometimes effect operations in cooperation with hardware, but are realized substantially with execution of a computer program.

The sub vehicle position detection module 71 has a similar configuration to that of the main vehicle position detection module 61 and detects a position of its own, that is, a position of the sub tractor 1C, with utilization of RTK-PGS. The path calculation module 74 calculates a target traveling path for use in the unmanned traveling of the sub tractor 1C. This sub tractor 1C effects unmanned traveling in the central work land CL along a pre-calculated central work land traveling path and effects unmanned follow-up traveling to follow the main tractor 1P in the headland HL along a path offset by a predetermined width relative to the traveling track of the main tractor 1P. For this reason, there are provided two path calculation sections having different target traveling path algorithms for use in the separate uses, that is, a central work land path calculation section 74a and a headland path calculation section 74b. The central work land path calculation section 74a calculates a central work land traveling path which is to be used in the unmanned steered work traveling of the sub tractor 1C in the central work land CL. The headland path calculation section 74b calculates a headland traveling path which is to be used in the unmanned steered traveling of the sub tractor 1C based on the work traveling track of the main work vehicle 1P in the headland HL.

In this sub tractor 1C, there is mounted the work land contour calculation module 73 which calculates the contour of the work land through "teaching traveling". More particularly, the sub tractor 1C will be caused to travel by manned control within a field as a work target along a border line relative to the ridge which defines the outer contour of this field to give instructions at the corner points of the field, whereby the work land contour calculation module 73 calculates the contour of the field (work land). In case map data of the field is available, such teaching traveling can be omitted. In either case, the central work land path calculation section 74a calculates a central work land traveling path, based on the contour of field calculated by the work land contour calculation module 73 or the map data. In this way, the path calculation module 74 generates differentiation data for differentiating the central work land CL from the headland HL based on the contour of the field and gives this data to the central work land path calculation section 74a and the headland path calculation section 74b.

The central work land path calculation section 74a calculates straight reciprocating paths and U-turn paths as the target traveling path for the sub tractor 1C, with taking into consideration the cultivating width of the main tractor 1P, the cultivating width of the sub tractor 1C and the overlap between the respective cultivating widths.

The headland path calculation section 74b has a function of calculating a turning traveling start point and a turning traveling completion point of the sub tractor 1C, based on respective working widths of the main tractor 1P and the sub tractor 1C, and also based on the turning traveling track of the main tractor 1P including the turning traveling start point and the turning traveling completion point of the main tractor 1P. The headland path calculation section 74b has a further function of calculating a target traveling position (target traveling path) in the headland work traveling of the sub tractor 1C from the turning traveling completion point to a next turning traveling start point, based on respective working widths of the main tractor 1P and the sub tractor 1C, and also based on the headland work traveling track of the main tractor 1P. Based on the data obtained by these functions, the headland path calculation section 74b calculates a headland traveling path to follow the main tractor 1P.

The steering control module 72 includes a first steering control section 72a and a second steering control section 72b. The first steering control section 72a effects unmanned-steering of the sub tractor 1C ahead of the main tractor 1P, based on the position of the sub work vehicle detected by the sub vehicle position detection module 71 and the central work land traveling path calculated by the central work land path calculation section 74a. The second steering control section 72b effects unmanned-steering of the sub tractor 1C to follow the main tractor 1P, based on the position of the sub work vehicle detected by the sub vehicle position detection module 71 and the headland traveling path calculated by the headland path calculation section 74b.

Incidentally, in the U-turn traveling path or the turning traveling path other than the straight work traveling path, the implement 5 will be temporarily elevated, thus being put into inoperative state. Therefore, the implement control unit 31c will effect elevation/lowering of the cultivator implement 5 in response to an instruction from the steering control module 72.

Figure 7:
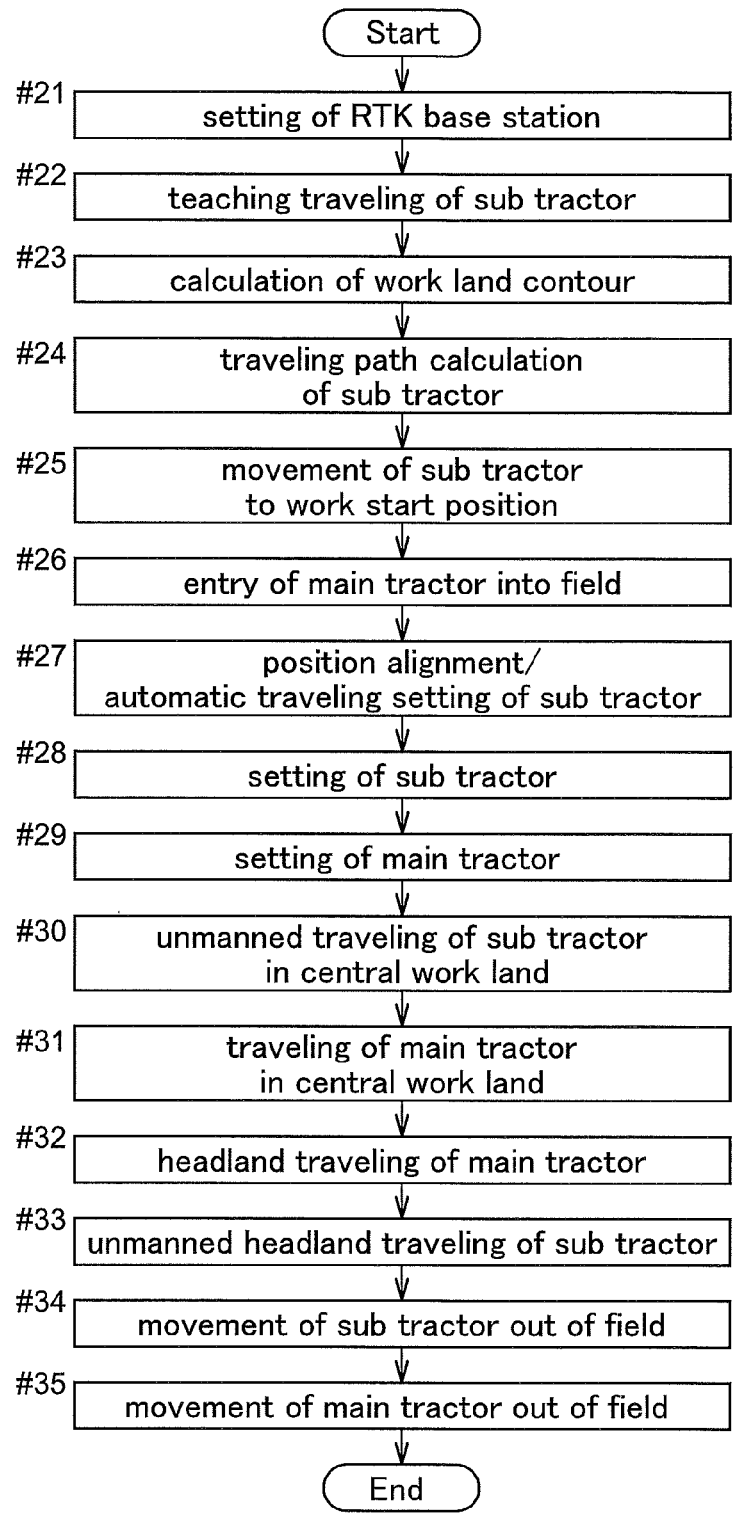
FIG. 7 is a flowchart illustrating an example of flow of work by the work vehicle coordinating system, FIG. 8 are diagrams for describing basic principle of the main work vehicle to follow the sub work vehicle in a headland, (a) illustrating an evacuation traveling path of the sub work vehicle, (b) illustrating traveling paths of a turning traveling (redirecting) and headland work traveling of the main work vehicle and (c) illustrating traveling paths of a turning traveling path and a round work traveling of the sub work vehicle.

Next, with reference to the flowchart in FIG. 7, an example of field work by coordinated traveling of the main tractor 1P and the sub tractor 1C in this embodiment will be described. Here, the field as the work target will be a field such as the one shown in FIGS. 1 through 3.

(Step #21) Setting of RTK Base Station

In order to activate the RTK-GPS, it is necessary to set an RTK base station adjacent the field as the work target. If unmanned traveling is effected in repetition in a same field, the RTK base station needs to be set at a same location. Therefore, it will be convenient if a stake or a post is installed as a landmark at the setting location of this RTK base station.

(Step #22) Teaching Traveling of Sub Tractor 1C

In order to produce a target traveling path for unmanned traveling, contour data of the field is necessary. However, if no map data or the like representing the field contour is available, the teaching traveling will be effected. In this case, an example of teaching procedure to be used is as follows.

(1) A driver will ride on the sub tractor 1C and enter the field by manual steering.

(2) A teaching program of the sub tractor 1C is started.

(3) The sub tractor 1C will be moved to the nearest corner of the field and then the sub tractor 1C will be moved to a start point of headland cultivation and then the cultivator implement 5 will be lowered. With this lowering operation of the cultivator implement 5, the work land contour calculation module 73 will take this location as a corner point of the field contour.

(4) The cultivator implement 5 will be elevated temporarily and the driver will move the tractor to a next corner while keeping the cultivating work to follow in mind.

(5) After turning traveling, the sub tractor 1C will be moved to the start point of cultivation work traveling and then the cultivator implement 5 will be lowered. With repetition of the above operations, the corner points of the field contour will be inputted.

(Step #23) Calculation of Work Land Contour

The work land contour is calculated with using, as input parameters thereof, the corner points of the field contour, the field entrance/exit and a direction thereof (i.e. field entering/exiting direction).

(Step #24) Traveling Path Calculation of Sub Tractor 1C

A traveling path of the sub tractor 1C is calculated with using, as input parameters thereof, the calculated work land contour (field contour), the respective calculated rotary cultivator widths of the sub tractor 1C and the calculated main tractor 1P, and the overlap amount thereof, etc.

(Step #25) Movement of Sub Tractor to Work Start Position

The sub tractor 1C is caused to travel to the vicinity of the cultivation start point based on the calculated traveling path. An unmanned traveling control program mounted on the sub tractor 1C for working the central work land CL is started.

(Step #26) Entry of Main Tractor 1P into Field

The man-steered main tractor 1P is advanced into the field and moved to the vicinity of the cultivation start position.

(Step #27) Position Alignment/Automatic Traveling Setting of Sub Tractor 1C

The driver will ride in the sub tractor 1C and move it to the cultivation start point. Meanwhile, this movement can be done by unmanned-steering also. In either case, it is important that the orientation of the vehicle body be aligned with the direction of traveling path as much as possible at the cultivation start point.

(Step #28) Setting of Sub Tractor 1C

Various settings for traveling operational devices (an engine speed, a vehicle speed, etc.) and the implement operational devices (a cultivating depth, etc.) required for work traveling of the sub tractor 1C are effected.

(Step #29) Setting of Main Tractor 1P

Various settings for traveling operational devices (an engine speed, a vehicle speed, etc.) and the implement operational devices (a cultivating depth, etc.) required for work traveling of the main tractor 1P are effected.

(Step #30) Unmanned Traveling of Sub Tractor 1C in Central Work Land CL

Unmanned work traveling of the sub tractor 1C in the central work land CL is started.

(Step #31) Manned Traveling of Main Tractor 1P in Central Work Land CL

After the sub tractor 1C starts the work traveling and a distance between this sub tractor 1C and the main tractor 1P reaches a predetermined value, work traveling by the main tractor 1P is started.

As shown in FIG. 1 or FIG. 4, when the cultivating traveling on the central work land CL is completed with the manned traveling main tractor 1P following the unmanned traveling sub tractor 1C, then, a cultivating traveling in the headland HL will be effected as described below, with the unmanned traveling sub tractor 1C following the manned traveling main tractor 1P. Incidentally, after completion of the cultivating traveling in the central work land CL, the sub tractor 1C will enter the headland HL and wait at a position not presenting any obstacle to a turning traveling required for cultivation in the headland HL by the leading main tractor 1P.

(Step #32) Manned Headland Traveling of Main Tractor 1P

After the turning traveling, the main tractor 1P starts cultivation of the headland HL.

(Step #33) Unmanned Headland Traveling of Sub Tractor 1C

With calculation of a traveling path as a target based on the traveling track of the leading main tractor 1P, the sub tractor 1C travels in the headland HL and starts cultivation of this headland HL.

For instance, in the case of the headland traveling path shown in FIG. 2 and FIG. 3, the sub tractor 1C will make a stop after completion of one round of cultivating traveling, whereas the main tractor 1P will make a stop after completion of two rounds of cultivating traveling. Then:

(Step #34) Movement of Sub Tractor 1C out of Field

The driver gets off the main tractor 1P and then gets on the sub tractor 1C and moves the sub tractor 1C to the outside of the field.

(Step #35) Movement of Main Tractor 1P out of Field

Further, the driver gets off the sub tractor 1C and then gets on the main tractor 1P and moves the main tractor 1P to the outside of the field.

Next, with reference to (a), (b) and (c) in FIG. 8, an example of follow-up control of the sub tractor 1C in the headland HL will be described. In this, the traveling track of the main work vehicle 1P is denoted with black bold lines, and the traveling track of the sub work vehicle 1C is denoted with white bold lines. Further, the turning traveling track of each vehicle, including a traveling track to the standby position, is denoted with broken lines. In this example, firstly, as shown in FIG. 8(a), firstly, the sub work vehicle 1C moves from a stop point Pc1 in the central work land CL to a standby point Pc2 set in the headland HC so as not to present any obstacle to the main work vehicle 1P which is to make first a turning traveling in the headland HL. The stop point Pc1 is also a turning traveling start point Pc1 of the sub work vehicle 1C in the headland HL. And, the standby point Pc2 is also a turning point Pc2 of the turning traveling of the sub work vehicle 1C in the headland HL. This movement can be done by either unmanned driving or manned driving.

In order to allow a headland traveling to proceed smoothly, the turning traveling of the main work vehicle 1P, which is executed by taking an appropriate path, needs to be followed by the sub work vehicle 1C. Firstly, as shown in FIG. 8(b), the main work vehicle 1P starts from the traveling start point Pp1 in the central work land CL and enters the headland HC. Incidentally, the main work vehicle 1P will be set to a working state (wherein the cultivator implement 5 is in its lowered state) during traveling in the central work land CL and will be set to a non-working state (wherein the cultivator implement 5 is in its elevated state) after entering the headland HL. After entering the headland HC, the main work vehicle 1P effects a forward turning traveling so as to place the rear end of the work vehicle 1P to face a headland work traveling start point (also a turning traveling completion point) Pp3 which is set at one corner of the field; and will make a stop at a turning point Pp2 where the rear end of the vehicle body 1P faces the headland work traveling start point Pp3. Next, the main work vehicle 1P travels in reverse until it reaches the turning traveling completion point Pp3 which constitutes the headland work traveling start point. Upon completion of the turning traveling, the main work vehicle 1P will travel in forward in the headland work traveling region under the working state (wherein the cultivator implement 5 is in its lowered state). This headland working traveling will be carried out in the manner of substantially straight traveling path.

When execution of the turning traveling of the main work vehicle 1P is detected based on the traveling track of the main work vehicle 1P, then, based on this traveling track and the respective ground working widths of the main work vehicle 1P and the sub work vehicle 1C (denoted as "WP" and "Wc", respectively, in (a), (b) and (c) of FIG. 8), a turning traveling completion point Pc3 of the sub work vehicle 1C is calculated as shown in FIG. 8(c). A target traveling position of the sub work vehicle 1C in its reverse traveling from the standby point Pc2 to the turning traveling completion point Pc3 will be calculated under the provision that the wheel track of the sub work vehicle 1C does not enter the headland work traveling width of the main work vehicle 1P, irrespectively of the traveling path of the turning reverse traveling of the main work vehicle 1P. A traveling target position in the headland work traveling from the headland work traveling start point, which constitutes also the turning traveling completion point Pc3, will be calculated based on the working width of the main work vehicle 1P, the working width of the sub work vehicle 1C and the headland work traveling path of the main work vehicle 1P. Then, the headland work traveling of the sub work vehicle 1C will be carried out based on the calculated traveling target position in the headland work traveling.

Next, with reference to FIG. 9 and FIG. 10, there will be described an example of the follow-up control of the sub work vehicle 1C in a turning traveling which is required at the first corner in the headland work traveling. In this example, FIG. 9 shows the traveling track of the main work vehicle 1P (in black bold lines), and FIG. 10 shows the traveling track of the sub work vehicle 1C (in white bold lines).

Figure 9:
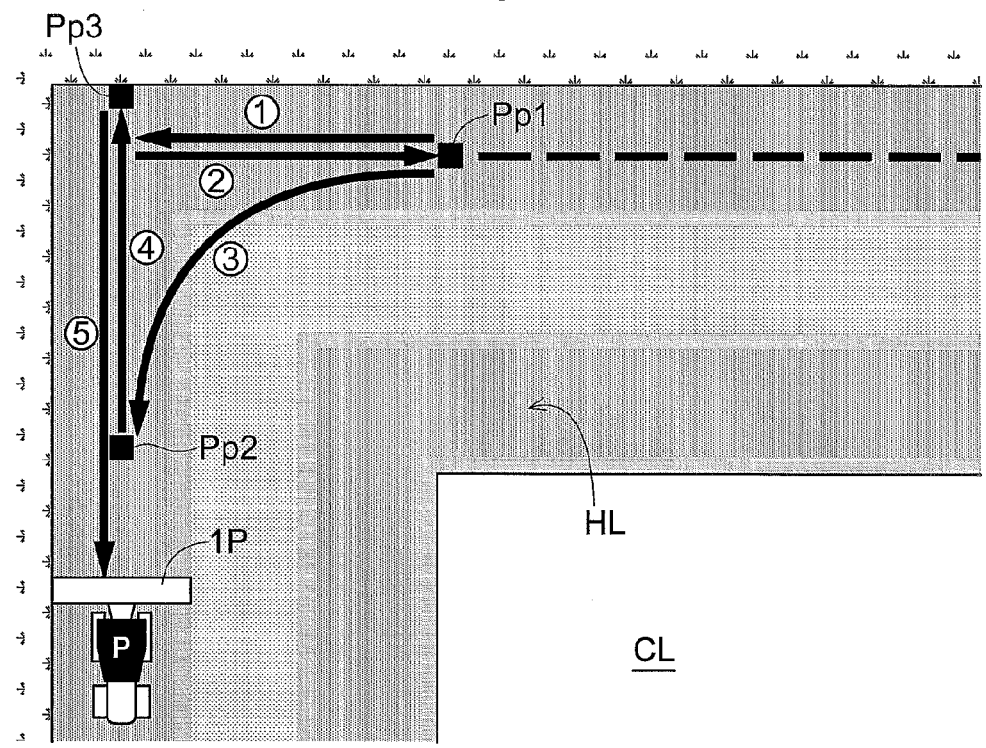
FIG. 9 is a diagram for describing a turning traveling of the main work vehicle in a headland corner.
Figure 10:
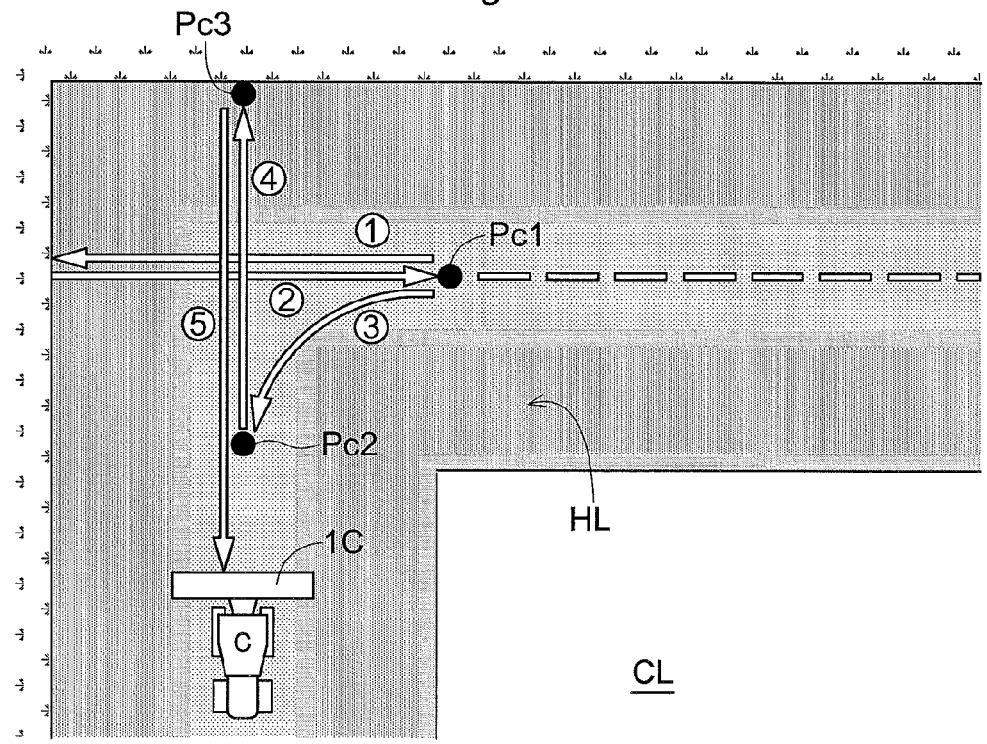
FIG. 10 is a diagram for describing a turning traveling of the sub work vehicle in a headland corner.

Firstly, when the leading main tractor 1P effects work traveling to an outer circumferential edge of the next corner region, as shown in FIG. 9, the main tractor 1P travels in reverse to the turning traveling start point Pp1 under the non-working state with the cultivator implement 5 being elevated. From this start point Pp1, the second round of turning traveling will be started. That is, from this turning traveling start point Pp1, the main tractor 1P will turn in forward to the turning point Pp2 under the non-working state. Next, the main tractor 1P travels in reverse to the outer edge of the headland HL and makes a stop. As this stop point becomes the start point of the next headland work traveling, the main tractor 1P will start forward traveling under the working state with the cultivator implement 5 being lowered. In the course of this, a line obtained by parallel shifting the traveling track of the forward traveling (headland working traveling) of the main tractor 1P by a distance which is a half of the working widths of the main tractor 1P and the sub tractor 1C will be calculated as a turning assisting line; and a turning point Pc2 will be calculated and determined on this turning assisting line. Further, a turning traveling start point Pc1 that allows arrival at this turning point Pc2 with an angle for turning will be calculated in advance.

The sub tractor 1C which has approached this corner will stand by until the main tractor 1P reaches a predetermined position so as to avoid interference with the main tractor 1P in the course of the turning traveling. Thereafter, as shown in FIG. 10, the sub tractor 1C will travel in forward under the working state past the turning traveling start point Pc1 as closely as possible to the outer edge of the headland HL. Next, the sub tractor 1C will travel in reverse to the turning traveling start point Pc1 under the non-working state with the cultivator implement 5 being elevated. In the turning traveling from the turning traveling start point Pc1, the sub tractor 1C will effect a forward turning to the turning point Pp2 in a similar manner to the turning traveling thereof at the time of start of headland traveling. Next, the sub tractor 1C will travel in reverse to the outer edge of the headland HL and makes a stop. As this stop point becomes the start point of the headland working traveling, the sub tractor 1C will travel in forward under the working state with the cultivator implement 5 being lowered. Similarly, after one round traveling through all the corners of the headland HL, working on the uncultivated land in the headland HL will be effected by the main tractor 1P alone in this example.

Other Embodiments (1) In the foregoing embodiment, in the central work land CL, the sub work vehicle 1C effects unmanned traveling ahead of the main work vehicle 1P. Whereas, in the headland HL, the main work vehicle 1P travels ahead and then the sub work vehicle 1C travels to follow it based on the traveling track of the main work vehicle 1P. However, in case the traveling path in the headland HL is relatively simple, the sub work vehicle 1C may effect unmanned traveling ahead of the main work vehicle 1P in the headland HL also.

Figure 11:
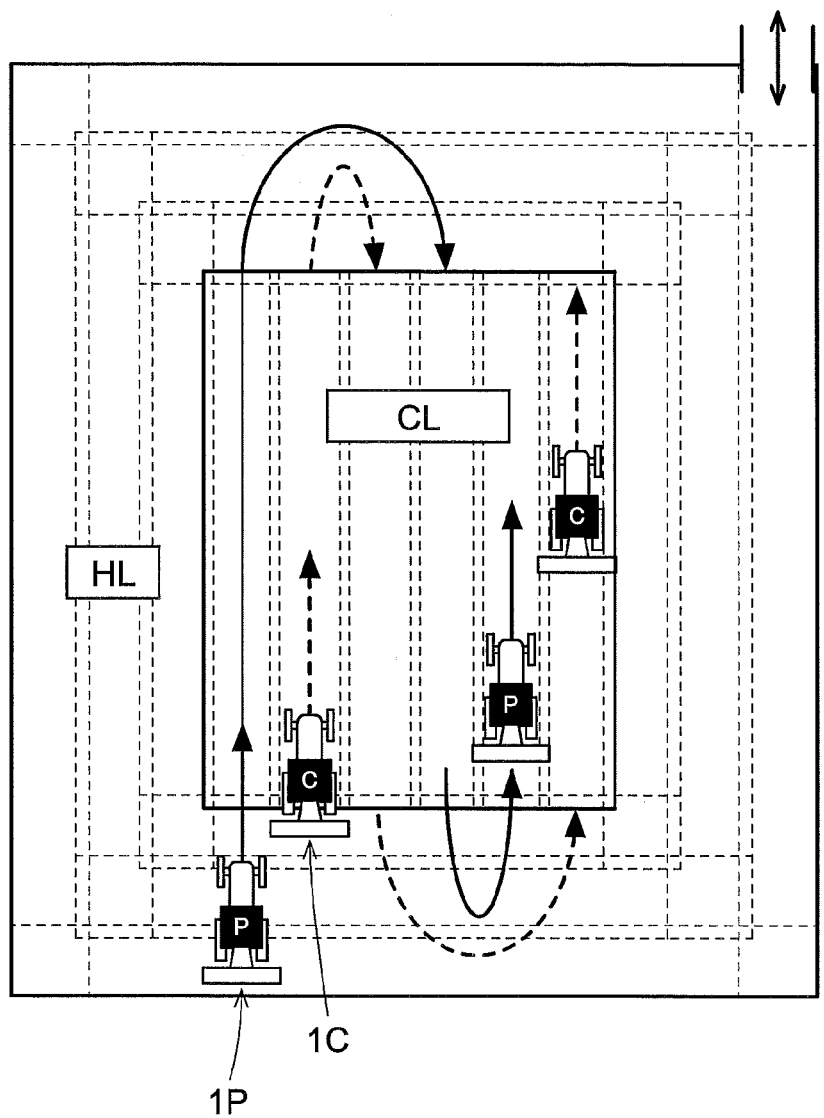
FIG. 11 is a diagram illustrating a coordinated traveling between the main work vehicle and the sub work vehicle in a central work land according to a further embodiment (2)

(2) In the foregoing, the relative positions of the sub work vehicle 1C and the main work vehicle 1P in their reciprocating work traveling paths in the central work land CL are in reverse to each other as shown in FIG. 1. That is, in the forward path, the main work vehicle 1P effects follow-up traveling on the left side of the sub work vehicle 1C and in the reverse path, the main work vehicle 1P effects follow-up traveling on the right side of the sub work vehicle 1C. Instead of this, as shown in FIG. 11, in the reciprocating work traveling paths, traveling paths without any change in the relative position between the sub work vehicle 1C and the main work vehicle 1P may be employed.

Figure 12:
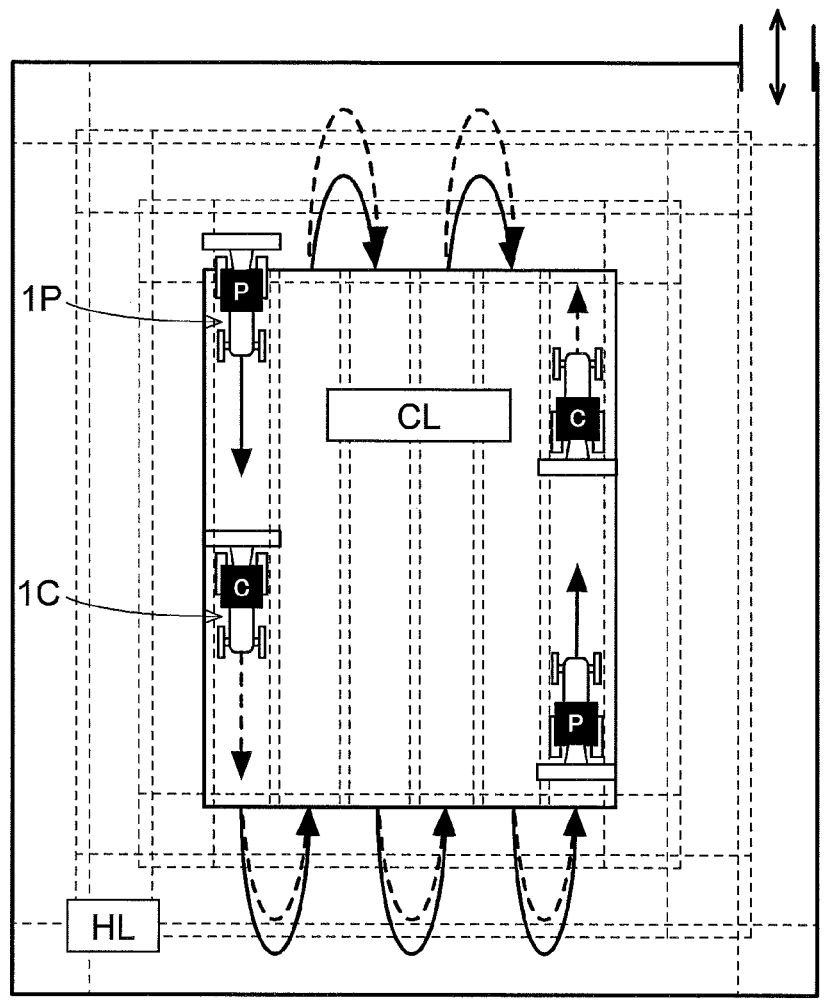
FIG. 12 is a diagram illustrating a coordinated traveling according to a further embodiment (3), in which the main work vehicle and the sub work vehicle leave a same traveling track in a central work land.
Figure 13:
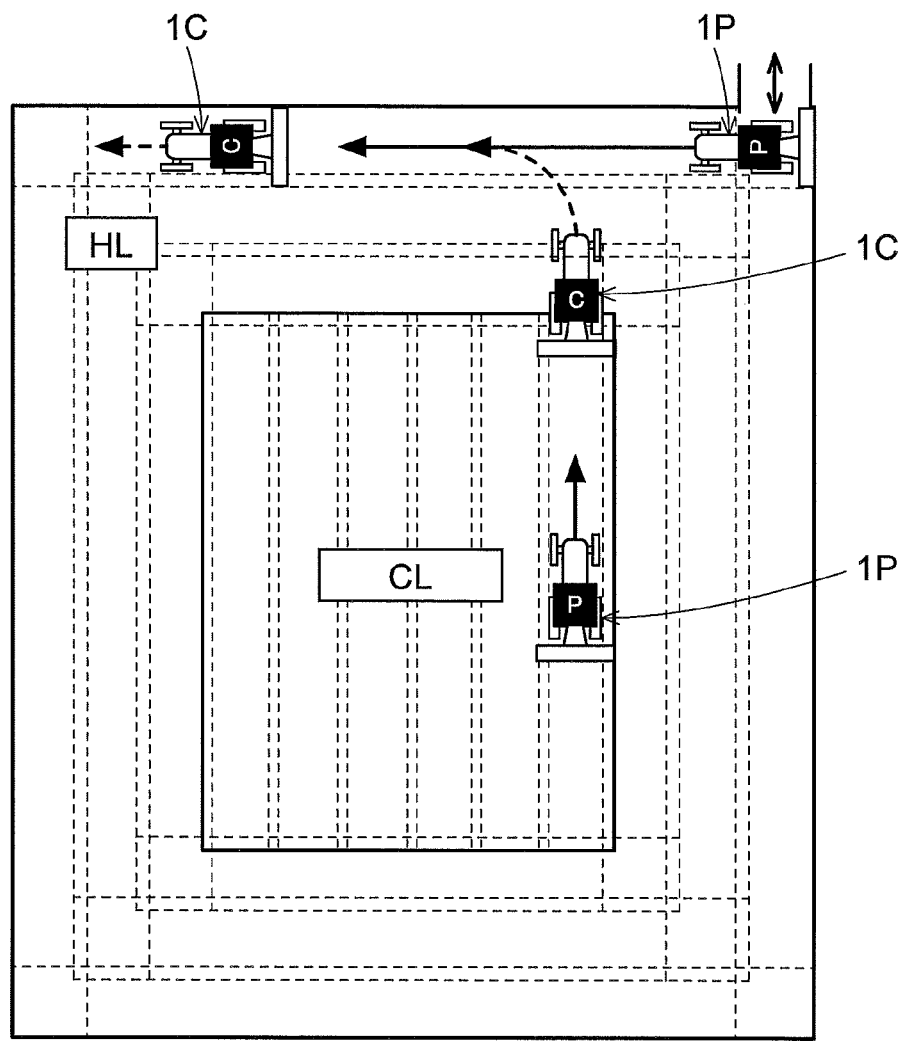
FIG. 13 is a diagram illustrating a coordinated traveling according to the further embodiment (3), in which the main work vehicle and the sub work vehicle leave a same traveling track in a headland.

(3) In the foregoing embodiment, the sub work vehicle 1C and the main work vehicle 1P mount a same type of implements (cultivator implements 5) and by juxtaposing the working widths thereof with each other, work efficiency was improved. Instead of such working coordination, it is also possible to arrange such that the two vehicles mount different implements to carry out two different kinds of works, with the following work vehicle traveling along a same traveling path as the leading work vehicle. FIG. 12 shows traveling paths of such work traveling in the central work land CL. And, FIG. 13 shows traveling paths in the headland HL. In FIG. 12 and FIG. 13, the sub work vehicle 1C leads. However, the main work vehicle 1P can lead instead. Further, the leading work vehicle may be changed between the central work land CL and the headland HL.

(4) The main work vehicle 1P and the sub work vehicle 1C can exchange data via their communication modules 60, 70 thereof. Instead thereof, such data exchange may be effected directly or can be effected via a relaying unit such as a server. The contents of such data to be exchanged will include e.g. a cultivating depth, a cultivating pitch, a rolling control situation, etc. For instance, by transmission of such data from the main work vehicle 1P under manned traveling to the sub work vehicle 1C under unmanned traveling, same or similar setting on the implement control unit 31c of the sub work vehicle 1C as/to the main work vehicle 1P is possible. And, depending on a situation, such data exchange should be advantageously effected regularly or effected by a timing decided by the driver. For this reason, it will be advantageous to provide a mode for regular data exchange and a mode for data exchange when desired. And, it will be also advantageous for the driver if switchover between such modes is possible with guidance display on a meter panel or a display unit mounted on the work vehicle. And, an input for such operation can be done with using a touch panel technique showing a software button or using a hardware button (e.g. a switch, a lever).

(5) The contents of such data exchanged between the main work vehicle 1P and the sub work vehicle 1C can advantageously be stored in a storage device such as a hard disc, a non-volatile memory, etc. In particular, setting data related to traveling, work provided from the main work vehicle 1P to the sub work vehicle 1C is important for the coordinated traveling. Even when the sub work vehicle 1C is keyed-off, at the time of restart, resetting will be made possible by reading out such setting data from the storage device, whereby the reproducibility of the work can be improved.

(6) In the foregoing embodiment, there was used only one sub tractor 1. Instead, by a similar control technique, it is also possible to apply the present invention to a plurality of sub tractors 1C.

(7) In the work vehicle coordinating system of the present invention, turning traveling tracks of the main tractor 1P and the sub tractor 1C are not limited to those traveling tracks described in the foregoing embodiment. It is possible to employ various traveling tracks that allow calculation of the turning traveling start position Pc1, the turning point Pc2 and the turning traveling completion point Pc3 of the sub tractor 1C from the working width of the main tractor 1P, the working width of the sub tractor 1C, and the turning traveling track including the turning traveling start point Pp1, the turning point Pc2 and the turning traveling completion point Pp3 of the turning traveling of the main tractor 1P. Further, the turning points Pp2, Pc2 of the main tractor 1P and the sub tractor 1C can be a single point or a plurality of points.

(8) In the foregoing embodiment, tractors were cited as the work vehicles mounting the cultivator implements 5. However, the characterizing features of the present invention can be effectively utilized also if other implements such as spraying devices, fertilization devices are mounted instead of the cultivator implements 5. Moreover, the present invention is applicable also to other kinds of work vehicles, such as combines, rice planters, grass mowers, weeding machines, or earth-moving machines such as bulldozers. Also, the main work vehicle 1P and the sub work vehicle 1C need not be of a same type. For instance, they can be a combination of a combine and a transporter truck, etc.

(9) In case the ground work implements are the cultivator implements 5, the overlap which is the overlapping length between the main working width and the sub working width is basically essential. On the other hand, in the case of spraying devices, fertilization devices, etc., rather than setting such overlap, there will be set a so-called "underlap" which keeps a predetermined spacing between the main working width and the sub working width. Therefore, in the present invention, setting the overlap is not essential; rather, what is essential is realization of follow-up control that can maintain the distance between the paths of the main work vehicle 1P and the sub work vehicle 1C within a predetermined range.

(10) It will be advantageous if the main work vehicle 1P and/or the sub work vehicle 1C are/is provided respectively with an offset information management section that manages offset information indicating a difference of types of the respective work vehicles. As such offset information management section can detect such difference based on the specification of one vehicle of its own and the specification of the other vehicle, the offset information management section can effect such traveling setting and work setting to compensate for such difference. If such offset information is provided in the form of a table, it becomes possible to set setting contents suited to the setting contents of one work vehicle to the other work vehicle. And, management of such offset information can be realized also in a vehicle coordinating control system involving three or more work vehicles, by sending contents of setting of one work vehicle to a plurality of other work vehicles. Furthermore, such offset information can be stored in a storage device of the work vehicle which becomes the management center or can be stored in a remotely managed computer which functions as a cloud system. Whereby, the work vehicles can acquire and use the offset information at any desired time.

INDUSTRIAL APPLICABILITY OF THE INVENTION

The present invention is applicable to a coordination control system for causing a plurality of work vehicles to effect work traveling in coordination with each other.

DESCRIPTION OF REFERENCE MARKS/NUMERALS

1C: sub tractor (sub work vehicle)
1P: main tractor (main work vehicle)
5: cultivator implement (work implement or implement)
6: main vehicle control unit
7: sub vehicle control unit
30: steering section
31c: implement control unit
60: communication module
61: main vehicle position detection module
62: main traveling track calculation unit
65: sub work vehicle implement remote control module
71: sub vehicle position detection module
72: steering control module
72a: first steering control section
72b: second steering control section
73: work land contour calculation module
74: path calculation module
74a: central work land path calculation section
74b: headland path calculation section
CL: central work land
HL: headland

What is claimed is:

1. A work vehicle coordinating system for carrying out a ground work in a central work land and a headland extending around the central work land by an unmanned steerable sub work vehicle and a man-steered main work vehicle in cooperation with each other, the system comprising:
   a main vehicle position detection module for detecting a position of the main work vehicle;
   a sub vehicle position detection module for detecting a position of the sub work vehicle;
   a central work land path calculation section for calculating a central work land traveling path to be used by the sub work vehicle in an unmanned steered work traveling in the central work land;
   a first steering control section for unmanned-steering the sub work vehicle ahead of the main work vehicle based on the position of the sub work vehicle detected by the sub vehicle position detection module and the central work land traveling path;
   a headland path calculation section for calculating a headland traveling path to be used for unmanned steered traveling of the sub work vehicle based on a traveling path of the main work vehicle in the headland; and
   a second steering control section for unmanned-steering the sub work vehicle to follow the main work vehicle based on the position of the sub work vehicle detected by the sub vehicle position detection section and the headland traveling path.

2. The work vehicle coordinating system according to claim 1, further comprising a work land contour calculation module configured to calculate a contour of the work land through a teaching travel;
   wherein the central work land path calculation section calculates the central work land traveling path, based on the work land contour calculated by the work land contour calculation module.

3. The work vehicle coordinating system according to claim wherein the work land contour calculation module is mounted on the sub work vehicle.

4. The work vehicle coordinating system according to claim 1, wherein the central work land path calculation section and the headland path calculation section are mounted on the sub work vehicle; and
   traveling data indicating a work traveling track of the main work vehicle in the headland is transmitted from the main work vehicle to the sub work vehicle.

5. The work vehicle coordinating system according to claim 1, further comprising a sub work vehicle implement remote control module mounted on the main work vehicle for remotely controlling an operation of a ground work implement mounted on the sub work vehicle.

* * * * *

UNITED STATES PATENT AND TRADEMARK OFFICE
CERTIFICATE OF CORRECTION

PATENT NO. : 9,526,199 B2  
APPLICATION NO. : 14/893368  
DATED : December 27, 2016  
INVENTOR(S) : Yushi Matsuzaki et al.

Page 1 of 1

It is certified that error appears in the above-identified patent and that said Letters Patent is hereby corrected as shown below:

In the Claims

Column 16, Line 29, Claim 3, after "claim" insert -- 2, --

Signed and Sealed this  
Twenty-first Day of March, 2017

Michelle K. Lee  
*Director of the United States Patent and Trademark Office*